(12) United States Patent
Cai et al.

(10) Patent No.: US 11,238,490 B2
(45) Date of Patent: Feb. 1, 2022

(54) DETERMINING PERFORMANCE METRICS FOR DELIVERY OF ELECTRONIC MEDIA CONTENT ITEMS BY ONLINE PUBLISHERS

(71) Applicant: Facebook, Inc., Menlo Park, CA (US)

(72) Inventors: Chaochao Cai, Bellevue, WA (US); Liang Xu, Bellevue, WA (US); Goran Predovic, Redmond, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 443 days.

(21) Appl. No.: 15/792,641

(22) Filed: Oct. 24, 2017

(65) Prior Publication Data
US 2019/0122257 A1    Apr. 25, 2019

(51) Int. Cl.
*G06Q 30/02* (2012.01)
*G06N 20/00* (2019.01)

(52) U.S. Cl.
CPC ......... *G06Q 30/0246* (2013.01); *G06N 20/00* (2019.01); *G06Q 30/0244* (2013.01); *G06Q 30/0255* (2013.01)

(58) Field of Classification Search
CPC ...................................... G06Q 30/00–30/0284
USPC ............................................. 705/14.1–14.73
See application file for complete search history.

(56) References Cited

U.S. PATENT DOCUMENTS

| | | | | |
|---|---|---|---|---|
| 2013/0332264 | A1* | 12/2013 | Chittilappilly | G06Q 30/02 705/14.45 |
| 2015/0006286 | A1* | 1/2015 | Liu | G06Q 30/0269 705/14.53 |
| 2015/0161657 | A1* | 6/2015 | Bidyuk | G06Q 30/0243 705/14.45 |
| 2016/0210661 | A1* | 7/2016 | Chittilappilly | G06Q 30/0246 |
| 2017/0140418 | A1* | 5/2017 | Yadagiri | G06Q 30/0244 |
| 2017/0372356 | A1* | 12/2017 | Frommann | G06Q 30/0246 |

* cited by examiner

*Primary Examiner* — John Van Bramer
(74) *Attorney, Agent, or Firm* — Fenwick & West LLP (57) ABSTRACT

Information describing deliveries of content items and user actions associated with the content items is stored. Each delivery is performed by an online publisher to a user. A user action associated with a content item performed by a target user is detected. Information describing a set of online publishers that delivered the content item to the target user is retrieved. For each online publisher of the set, a likelihood that the user action would have occurred without the online publisher's delivery of the content item to the target user is determined. An estimated increase in the likelihood that the user action occurred due to the online publisher's delivery of the content item to the target user is determined. A performance metric is determined for the online publisher, wherein ratios of performance metrics for the set of online publishers are related based on corresponding ratios of the estimated increases in likelihoods.

13 Claims, 5 Drawing Sheets

DETERMINING PERFORMANCE METRICS FOR DELIVERY OF ELECTRONIC MEDIA CONTENT ITEMS BY ONLINE PUBLISHERS

BACKGROUND

This disclosure relates generally to delivery of electronic media content items, and in particular to determining performance metrics for online publishers delivering the content items.

Content providers and social networking systems often present content items to users via websites of online publishers. Such content items are viewed by users on user devices, for example, a laptop or a mobile device. Users typically interact with content items by clicking on them, sharing them with their social networking connections, making financial transactions, etc., on a user device.

Conventional techniques for determining performance metrics for online publishers, such as which publisher influenced a user action associated with a content item delivered by a subset of publishers sometimes provide inaccurate or poor results. Some conventional techniques attempt to allocate credit for performance only to the last publisher in a sequence of publishers that delivered the content item, resulting in imprecise performance metric determination because the techniques do not account for which online publishers really influenced the user action.

SUMMARY

An online system stores information describing deliveries of content items and user actions associated with the delivered content items. Each delivery is performed by one of a plurality of online publishers to one of a plurality of users of the online system. A user action associated with a content item performed by a target user of the plurality of users is detected. From the stored information, information describing a set of the plurality of online publishers that delivered the content item to the target user is retrieved. For each online publisher of the set of the plurality of online publishers, a likelihood is determined that the user action would have occurred without the online publisher's delivery of the content item to the target user. An estimated increase in the likelihood that the user action occurred due to the online publisher's delivery of the content item to the target user based on the determined likelihood that the user action would have occurred without the online publisher's delivery of the content item to the target user is determined. A performance metric is determined for the online publisher, wherein ratios of performance metrics for the set of the plurality of online publishers are related based on corresponding ratios of estimated increases in likelihoods that the user action occurred due to deliveries of the content item by the set of the plurality of online publishers. The performance metrics for the set of the plurality of online publishers for the user action may be transmitted within the online system, to a content provider, to an online publisher, or to a third party entity.

DETAILED DESCRIPTION

Example System Environment

Figure 1:
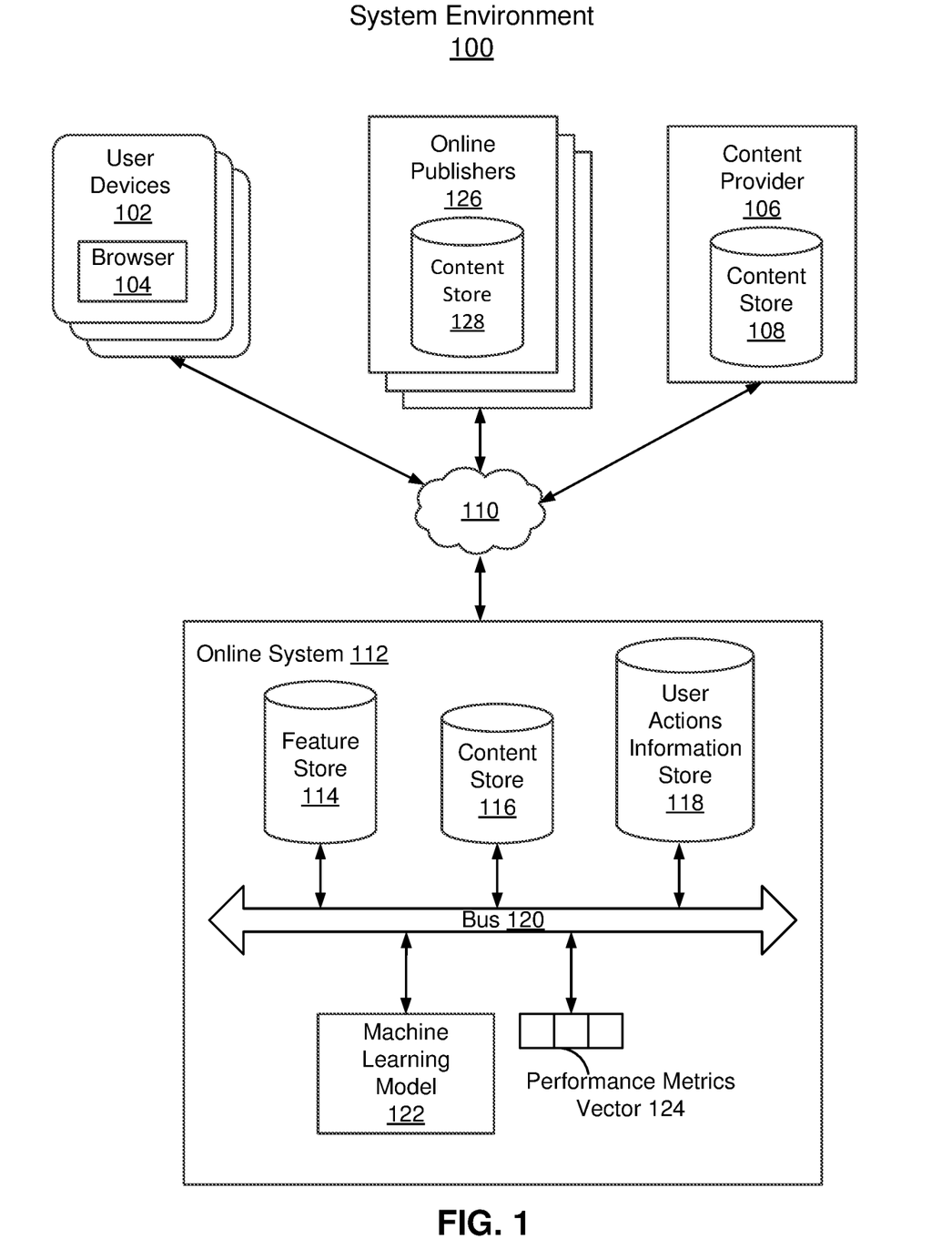
FIG. 1 is a block diagram of an example system environment in which an online system operates, in accordance with an embodiment.

FIG. 1 is a block diagram of an example system environment 100 in which an online system 112 operates, in accordance with an embodiment. The system environment 100 shown in FIG. 1 includes a content provider 106, online publishers 126, user devices 102, a network 110, and the online system 112. The term "content item" refers to "electronic media content item" herein.

The online system 112 receives content items from the content provider 106 for distribution by the online system 112 and the online publishers 126. The content provider 106 may be a provider of sponsored content such as a political campaign, a university, a corporation, the government, etc. Sponsored content includes content items for which the content provider 106 provides remuneration to the online system 112 for targeting and distribution of the content items to the user devices 102 of an online audience. Content items may be images, text paragraphs, video clips, audio clips, hyperlinks, online forms, etc. Examples of sponsored content include online advertisements. The content provider 106 may include a content store 108 for storing content items. The content store 108 may be organized as a database, table, file, etc., stored on one or more of removable or non-removable memory cards and computer hard drives.

The online publishers 126 publish content on the Internet, create and upload websites, update webpages, and transmit text, images, videos, and other types of media to the user devices 102. In embodiments, ($P_1$, $P_2$, . . . , $P_N$) represents the identities of the N online publishers 126. A content item may be delivered to user devices 102 by a set (e.g., $P_1$, $P_5$, and $P_7$) of the N online publishers 126. In embodiments, the content provider 106 may transmit content items from the content store 108 to the online publishers 126 directly via the network 110. The online publishers 126 then embed the content items on webpages maintained by the online publishers 126 and delivered to user devices 102. In embodiments, the content provider 106 may transmit content items from the content store 108 to the online system 112 via the network 110. The online system 112 may transmit the content items from the content store 116 to the online publishers 126 via the network 110. The online publishers 126 then embed the content items on webpages maintained by the online publishers 126 and delivered to user devices 102. Each online publisher may include a content store 128 for storing content items. The content store 128 may be organized as a database, table, file, etc., stored on one or more of removable or non-removable memory cards and computer hard drives.

The online system 112 or online publishers 126 present content items to the user devices 102. A user device 102 is used for interacting with the online system 112 or with third-party websites such as the online publishers 126 using the browser 104. The user device 102 is a computing device capable of receiving user input as well as transmitting and/or receiving data via the network 110. In one embodiment, the user device 102 is a conventional computer system, such as a desktop or laptop computer. Alternatively, the user device 102 may be a device having computer functionality, such as a personal digital assistant (PDA), a tablet, a mobile telephone, a smartphone or another suitable device.

In embodiments, the user device 102 executes an application allowing a user to interact with the online system 112. The user device 102 may execute an application, for example, the browser 104, to enable action between the user device 102 and the online system 112 or online publishers 126 via the network 120. In embodiments, the user device 102 interacts with online publishers 126 through an application programming interface (API) running on a native operating system of the user device 102, such as IOS® or ANDROID™. A user may download content items from the online system 112 or web sites of online publishers 126 to the user device 102 using browser 104 and interact with the content items by clicking on a link in a content item, filling in user information into an online form, closing the content item using a "close window" button on the browser 104 or on the user device 102, etc.

The content provider 106, online publishers 126, user devices 102, and online system 112 are configured to communicate via the network 110 shown in FIG. 1, which may include any combination of local area and/or wide area networks, using both wired and/or wireless communication systems.

In one embodiment, the online system 112 may be a social networking system. The online system 112 may include a content store 116, feature store 114, user actions information store 118, a machine learning model 122, and a bus 120. The content store 116, feature store 114, user actions information store 118, and the machine learning model 122 are configured to communicate via the bus 120. The user actions information store 118 stores information describing deliveries of content items to user devices 102 and user actions associated with the delivered content items. Each delivery is performed by one of the plurality of online publishers ($P_1$, $P_2$, ..., $P_N$) to one of the users of the online system 112. The user actions information store 118 may be organized as a database, table, file, etc., stored on one or more of removable or non-removable memory cards and computer hard drives. The user actions information store 118 is described in detail below with reference to FIG. 2.

The online system 112 may include a content store 116 for storing content items received from the content provider 106 to be transmitted to the online publishers 126. The content store 116 may be organized as a database, table, file, etc., stored on one or more of removable or non-removable memory cards and computer hard drives.

The online system 112 extracts feature vectors from the user actions information store 118. The feature vectors are related to deliveries, by the online publishers 126, of content items associated with user actions. The features are stored in a feature store 114. The feature store 114 may be organized as a database, table, file, etc., stored on one or more of removable or non-removable memory cards and computer hard drives. The machine learning model 122 is trained, based on the feature vectors, to generate a likelihood ($L_i$) for each online publisher ($P_i$) that a target user's action associated with a content item would have occurred without a particular online publisher's delivery of the content item to the target user. This likelihood relates to the amount of influence the delivery of the content item by the online publisher ($P_i$) likely had on the target user who performing the particular action. For example, a content item delivered to a user device 102 by a particular online publisher may make it more likely that the user performed the action than the content item's delivery to the user by a different online publisher.

The online system determines an estimated increase ($EI_i$) in the likelihood that the particular user action occurred due to the delivery by the online publisher ($P_i$) of the content item to the target user based on the generated likelihood ($L_i$) that the user action would have occurred without the online publisher's delivery of the content item to the target user. The online system 112 determines a performance metric ($Perf_i$) for the online publisher, wherein ratios of performance metrics for the online publishers ($P_1$, $P_2$, ..., $P_N$) are related based on corresponding ratios of estimated increases in likelihoods that the user action occurred due to deliveries of the content item by the online publishers.

The performance metrics vector 124 indicates, for each of a set of publishers, a relative increase in the likelihood that a user performed an action associated with a content item because the content items was delivered by that publisher. This relative increase for each publisher may be computed by predicting a likelihood that the action would have been performed if the publisher did not deliver the content item to the user. The difference between this likelihood and 1 is equal to or otherwise relates to the increase in the likelihood that the action was performed due to each publisher's delivery of the content item.

The online system 112 may transmit the performance metrics for the online publishers for the user action to a content provider, an online publisher, or a third party entity. The online system 112 as disclosed processes data within the stored information describing the user actions associated with the content items into a digital representation of performance metrics for the online publishers. These performance metrics are beneficially used to compute an attribution of each publisher's delivery of content items to the user's action.

Example System Architecture

Figure 2:
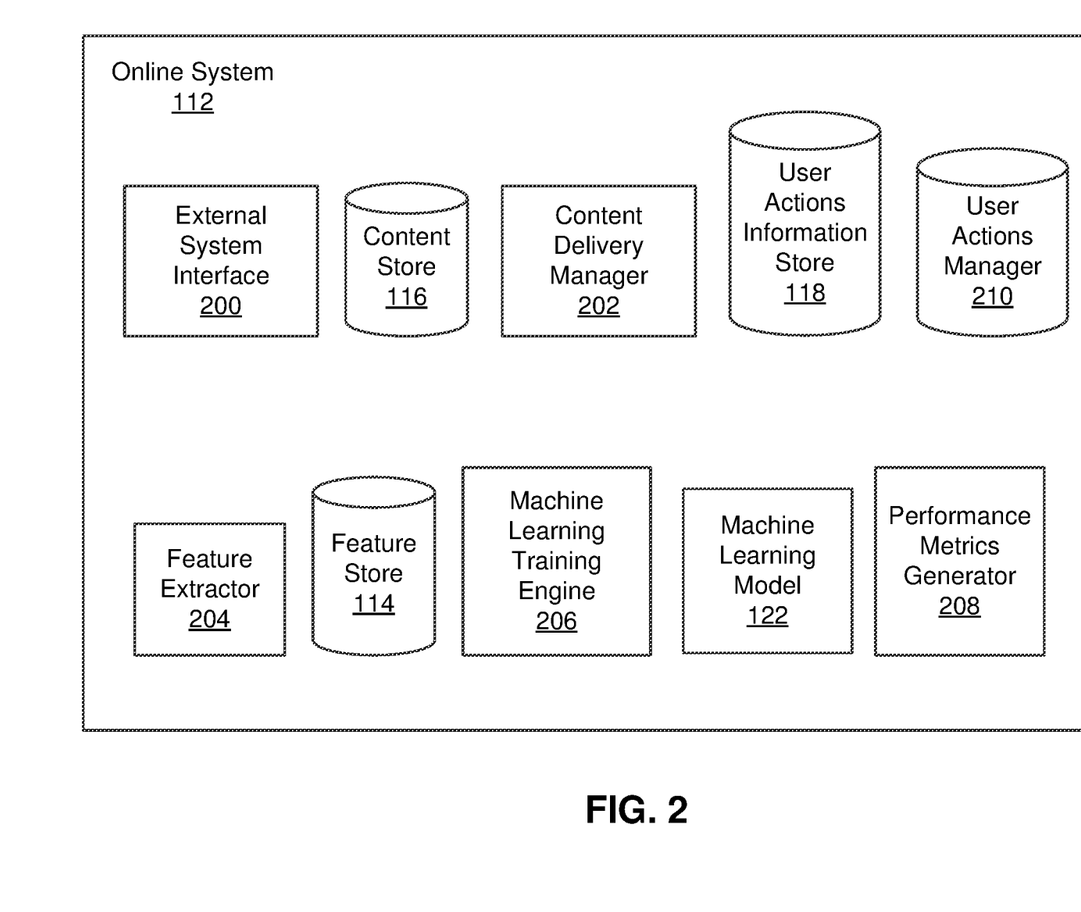
FIG. 2 is a block diagram of an example system architecture of the online system, in accordance with an embodiment.

FIG. 2 is a block diagram of an example system architecture of the online system 112, in accordance with an embodiment. The architecture of the online system 112 includes an external system interface 200, the content store 116, a content delivery manager 202, the user actions information store 118, a user actions manager 210, a feature extractor 204, the feature store 114, a machine learning training engine 206, the machine learning model 122, and a performance metrics generator 208.

The external system interface 200 is a dedicated hardware networking device or software module that receives data packets representing content items from the content provider 106, data packets of information describing delivery of content items by the online publishers 126, and data packets describing user actions associated with content items by users of the online system 112. The external system interface 200 may receive at least a portion of the information describing the deliveries of content items by the online publishers 126 and user actions associated with the content items from user devices 102 responsive to rendering tracking pixels on websites of the online publishers 126. The external system interface 200 forwards data packets representing content items to the online publishers 126, and performance metrics vectors 124 to the content provider 106. In one example, the external system interface 200 forwards data packets at high speed along the optical fiber lines of the Internet backbone. In another example, the external system interface 200 exchanges routing information using the Border Gateway Protocol (BGP) and may be an edge router, a border router, or a core router.

The online system 112 may include a content store 116 for storing content items received from the content provider 106 to be transmitted to the online publishers 126. The content store 116 may be organized as a database, table, file, etc., stored on one or more of removable or non-removable memory cards and computer hard drives. The content store 116 may include multiple data fields, each describing one or more attributes of the content items. For example, the content store 116 may contain, for a single content item, the content provider 106 of the content item, a set (e.g., $P_1$, $P_5$, and $P_7$) of the online publishers 126 who are to deliver the content item, topics of the content item, whether the content item is for a particular product, etc.

The content delivery manager 202 transmits content items, meant for client devices 102 of users of the online system 112, to online publishers 126 via the external system interface 200. The content delivery manager 202 also receives data packets describing the deliveries of content items to users of the online system 112 by online publishers 126 via the external system interface 200. The information describing the delivery of content items to user devices 102 may include the identity of a set (e.g., $P_1$, $P_5$, and $P_7$) of the online publishers 126 that delivered a particular content item. In one embodiment, the set of online publishers is represented as an ordered sequence of the online publishers 126 that delivered the content item. For example, a set may be represented as ($P_5 \rightarrow P_1 \rightarrow P_7$). In this example, the content item was first delivered to the user device 102 by online publisher $P_5$, then by online publisher $P_1$, and then by online publisher $P_7$.

The information describing the deliveries of the content items may include information indicating whether a content item was delivered within one or more of a banner of a website, an online game, or a body of a webpage. A banner of a website or a web banner is a form of advertising on the World Wide Web delivered by an ad server, such as the online system 112. It is also known as a banner ad. An online game is a video game that is either partially or primarily played through the Internet or a computer network 110. If a content item is delivered within a body of a web page, it may be placed between text paragraphs or images.

The information describing the deliveries of the content items may include information indicating whether each content item was delivered to one or more of a laptop, a desktop, a tablet, or a smartphone. The information may be encoded in a compressed form (e.g., using Huffman encoding) using digital vectors or code words. Information describing deliveries of content items and user actions associated with the delivered content items performed on user devices 102 may be stored in the user actions information store 118.

The user actions information store 118 stores information describing user actions by users of the online system 112 with content items delivered by the online publishers 126. The information may include, for each detected user action, a set of online publishers that delivered the content item associated with the user action, e.g., ($P_5 \rightarrow P_1 \rightarrow P_7$). The information may also include the type of user action associated with each content item, the number of times each online publisher (e.g., $P_1$) delivered the content item, the time of each delivery, etc., A user action associated with a content item comprises one or more of a user of the online system registering on a web site of a content provider, the user attending an online event corresponding to the content item, the user sharing the content item with other users of the online system, the user clicking on a link in the content item, and the user purchasing a product associated with the content item. In an embodiment, the user actions information store 118 may store the information describing deliveries of content items and user actions associated with the delivered content item in the format: ($P_5 \rightarrow P_1 \rightarrow P_7$)$\rightarrow$(User Clicked on Link in Content Item), which means that after the set of online publishers ($P_5 \rightarrow P_1 \rightarrow P_7$) delivered a content item to the user device 102, the user clicked on a link in the content item.

The user actions information store 118 may also store information describing delivery of content items by sets of online publishers (e.g., $P_1$, $P_5$, and $P_7$) that did not result in user actions associated with the content item. From this information, the online system 112 may determine a likelihood or rate of user actions responsive to delivering of content items by the subset of online publishers (e.g., $P_1$, $P_5$, and $P_7$). For example, if contents items were delivered to user devices 102 by the subset ($P_1$, $P_5$, and $P_7$) of online publishers I times, and the content items received C user actions, the user actions information store 118 may store the likelihood or rate of user actions for the subset ($P_1$, $P_5$, and $P_7$) as (C/I) or (C/I×100).

The user actions information store 118 may also store affinity scores for users and online publishers or sets of online publishers. Affinity scores, or "affinities," may be computed by the online system 112 over time to approximate a user's affinity for content items delivered by an online publisher ($P_i$) based on the user actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety.

The user actions manager 210 populates the user actions information store 118 with the information describing the user actions by users of the online system 112, e.g., ($P_5 \rightarrow P_1 \rightarrow P_7$)$\rightarrow$(User clicked on link in content item). The user actions manager 210 may also determine and populate the user actions information store 118 with information describing the likelihood or rate of user actions, responsive to delivering a content item by a set of online publishers (e.g., $P_5 \rightarrow P_1 \rightarrow P_7$)$\rightarrow$(50%). In embodiments, this could mean that 50% of content items received user actions when delivered by the set of online publishers ($P_5 \rightarrow P_1 \rightarrow P_7$) or 50% of users performed user actions when the set of online publishers ($P_5 \rightarrow P_1 \rightarrow P_7$) delivered content items.

The user actions manager 210 receives at least a portion of the information describing deliveries of content items and user actions associated with the delivered content items from user devices 102, responsive to rendering tracking pixels on websites of the plurality of online publishers 126. The online system 112 includes tracking pixels in the content items presented to client devices 102 such that when a content item is presented via the browser 104 of the client device 102, a particular program or code (or set of instructions) is executed by the browser 104. This code associated with a tracking pixel causes a browser identifier associated with the user to be sent to the user actions manager 210. A tracking pixel may be a transparent 1×1 image, an iframe, or other suitable user interface object.

After a user has clicked on a content item, the user may purchase a product related to the content item on a third-party website of an online publisher ($P_i$) or a mobile application, or otherwise interact with a third-party website of an online publisher ($P_i$) related to the content item. When the user's client device 102 receives a page from the third-party website ($P_i$), a tracking pixel may fire, causing the browser 104 to transmit information to the online system 112 about the user actions performed by the user on the third-party website ($P_i$).

The feature extractor 204 is used to create features by extracting a feature vector from the retrieved information describing a set (e.g., $P_1$, $P_5$, and $P_7$) of the online publishers 126 that delivered a content item associated with a user action. For example, when the user actions manager 210 detects a user action associated with a content item, it may retrieve the identity of the set of online publishers (e.g., $P_1$, $P_5$, and $P_7$) that delivered the content item prior to the user action. The feature extractor 204 provides the feature vector to a machine learning model 122 that generates a likelihood (e.g., $L_1$) for each online publisher (e.g., $P_1$) in the set that the user action would have occurred without the delivery of the content item by the online publisher ($P_1$). The feature extractor 204 may extract a feature vector from the delivery and action information including the type of user action that occurred, whether the content item was delivered within a banner of a website, an online game, or a body of a webpage, and whether the content item was delivered to a laptop, a desktop, a tablet, or a smartphone.

The feature store 114 is used to store features extracted from the stored information describing the user actions associated with the content items by the feature extractor 204. The feature store 114 may be organized as a database, table, file, etc., stored on one or more of removable or non-removable memory cards and computer hard drives.

The machine learning training engine 206 trains the machine learning model 122 using training sets obtained from the content store 116, the user actions information store 118, and feature store 114. Each training set includes a feature vector for a user action associated with a content item and a label that indicates whether the user performed the user action associated with the content item. The features describe the deliveries of the content item that resulted in the user action, e.g., the set of online publishers (e.g., $P_5 \rightarrow P_1 \rightarrow P_7$) that delivered the content item, the manner in which the content item was delivered, the types of user action, etc. The process executed by the machine learning training engine 206 is illustrated and described below with reference to FIG. 4.

The machine learning model 122 is an analytical predictive model built from sample inputs that produces reliable, repeatable decisions and results and may uncover hidden insights through learning from historical relationships and trends in the stored information describing the delivery of the content items and feature vectors extracted from the content items. For a user action, the machine learning model 122 generates from the extracted feature vector, for each online publisher (e.g., $P_5$) of the set (e.g., $P_5 \rightarrow P_7 \rightarrow P_2$) of online publishers ($P_1, P_2, \ldots, P_7$), a likelihood ($L_5$) for the online publisher ($P_5$) that the user action would have occurred without the delivery of the content item by the online publisher ($P_5$)—that is, if the deliveries were performed by the set ($P_7 \rightarrow P_2$). The machine learning model may further determine an estimated increase $EI_5$ in the likelihood that the user action occurred due to the online publisher's delivery ($P_5$) of the content item to the target user based on the generated likelihood ($L_5$) that the user action would have occurred without the online publisher's delivery of the content item to the target user. For example, if ($L_5$)=75%, then ($EI_5$) may be determined as (100%−75%), or 25%.

Continuing with the above example, assume that the deliveries for a content item associated with a user action were performed by the set of publishers ($P_5 \rightarrow P_7 \rightarrow P_2$). The machine learning model may determine the likelihood values of each publisher in the set as: $L_5$=75%; $L_7$=25%; and $L_2$=25%. Then the estimated increase values may be determined as $EI_5$=(100%−75%); $EI_7$=(100%−25%); and $EI_2$=(100%−25%) or $EI_5$=25%; $EI_7$=75%; and $EI_2$=75%.

The performance metrics generator 208 determines a performance metric ($Perf_i$) for each online publisher ($P_i$), wherein ratios of performance metrics for the set of publishers ($P_5 \rightarrow P_7 \rightarrow P_2$) are related based on corresponding ratios of estimated increases $EI_i$ in likelihoods that the user action occurred due to deliveries of the content item by the set of the plurality of online publishers. Continuing with the above example, the performance metric ($Perf_i$) for each online publisher ($P_i$) in the set may be determined as ($EI_5:EI_7:EI_2$) or ($1/EI_5:1/EI_7:1/EI_2$). Therefore, performance metrics generator 208 would determine the performance metrics vector 124 in this example as (1:3:3) or (⅓:1:1).

The performance metrics generator 208 may further normalize the performance metrics across the set ($P_5$, $P_7$, and $P_2$) of online publishers as follows. The normalized performance metric for online publisher ($P_5$) may be generated as (($Perf_5$/($Perf_5+Perf_7+Perf_2$))×100)=((⅐)×100)=14%. Therefore, the credited performance for online publisher ($P_5$) for the user action is determined to be 14%. Similarly, the credited performance for online publisher ($P_7$) and online publisher ($P_2$) for the user action would each be 43%.

In an alternate embodiment, the performance metrics generator 208 may determine both the likelihood ($L_i$) as well as the performance metric ($Perf_i$) for each online publisher ($P_i$) in a set (e.g., $P_1$, $P_7$, and $P_2$), as illustrated and described in detail below with reference to FIGS. 3 and 5.

Example Process

Figure 3:
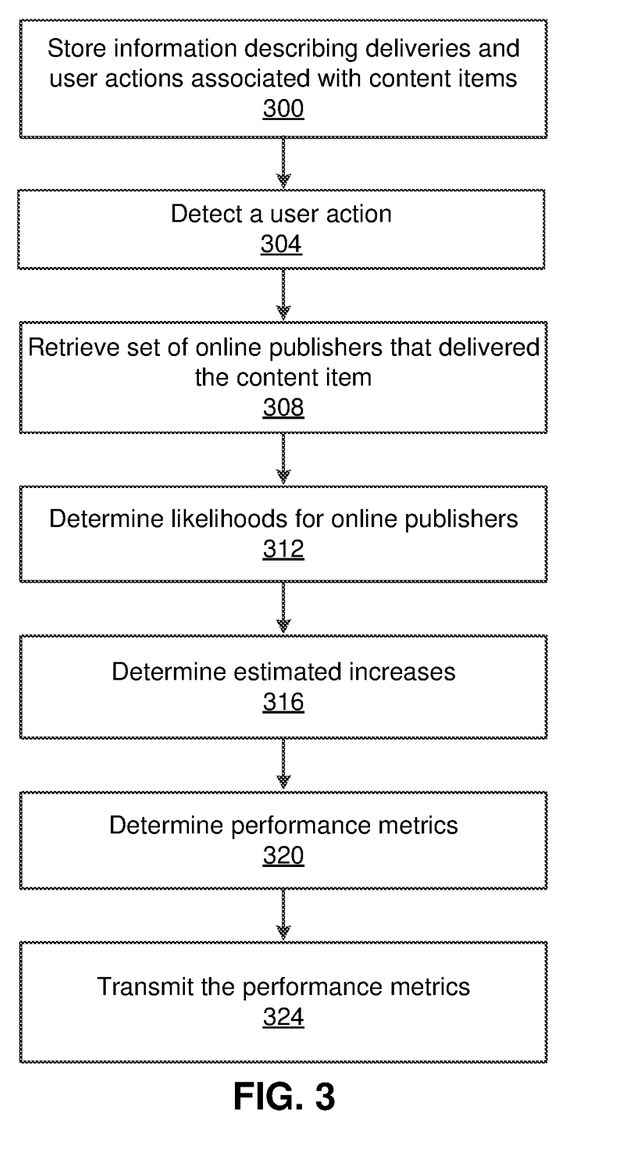
FIG. 3 illustrates an example process of determining performance metrics for online publishers, in accordance with an embodiment.

FIG. 3 is a flowchart illustrating an example process of predicting performance metrics for delivery of content items by online publishers 126, in accordance with an embodiment. In some embodiments, the process may have different and/or additional steps than those described in conjunction with FIG. 3. Steps of the process may be performed in different orders than the order described in conjunction with FIG. 3. Some steps may be executed in parallel. Alternatively, some of the steps may be executed in parallel and some steps executed sequentially. Alternatively, some steps may execute in a pipelined fashion such that execution of a step is started before the execution of a previous step.

The online system 112 stores 300 information describing deliveries of content items to user devices 102 and user actions associated with the delivered content items. Each delivery is performed by one of a plurality of online publishers 126 to one of a plurality of users of the online system 112. The online system 112 detects 304 a user action associated with a content item performed by a target user of the plurality of users. The online system 112 retrieves 308, from the stored information, information describing a set S of the plurality of online publishers 126 that delivered the content item to the target user.

For each online publisher ($P_i$) of the set S of the plurality of online publishers, the online system 112 determines 312 a likelihood ($L_i$) that the user action would have occurred without the online publisher's ($P_i$) delivery of the content item to the target user. In one embodiment, the determining of the likelihood ($L_i$) that the user action would have occurred without the online publisher's delivery of the content item to the target user comprises extracting a feature vector from the retrieved information describing the set S of the plurality of online publishers 126 that delivered the content item to the target user. The online system 112 provides the feature vector to a machine learning model 122 that generates the likelihood ($L_i$) that the user action would have occurred without the online publisher's delivery of the content item to the target user.

In one embodiment, the determining of the likelihood ($L_i$) that the user action would have occurred without the online publisher's ($P_i$) delivery of the content item to the target user comprises filtering the stored information describing the deliveries of the content items and the user actions associated with the delivered content items, by the set S of the plurality of online publishers, to obtain the likelihood ($L_i$) that the user action would have occurred without the online publisher's delivery of the content item to the target user. For example, assume the set S comprises ($P_5$, $P_7$, and $P_2$). The stored information 118 may include 1,000,000 instances of a subset ($P_7$ and $P_2$) of the set S delivering the content item, where the subset excludes the online publisher ($P_5$). The number of instances of user actions for deliveries by the subset may be 750,000. Then the likelihood ($L_5$) that the user action would have occurred without the online publisher's delivery of the content item to the target user would be $L_5$=75%.

The online system 112 determines 316 an estimated increase ($EI_i$) in the likelihood that the user action occurred due to the online publisher's delivery of the content item to the target user based on the determined likelihood ($L_i$) that the user action would have occurred without the online publisher's delivery of the content item to the target user. The online system 112 determines 320 a performance metric ($Perf_i$) for the online publisher ($P_i$), wherein ratios of performance metrics for the set of the plurality of online publishers are related based on corresponding ratios of estimated increases ($EI_i$) in likelihoods that the user action occurred due to deliveries of the content item by the set of the plurality of online publishers.

The online system 112 may transmit the performance metrics for the set of the plurality of online publishers for the user action.

Example Machine Learning Training Process

Figure 4:
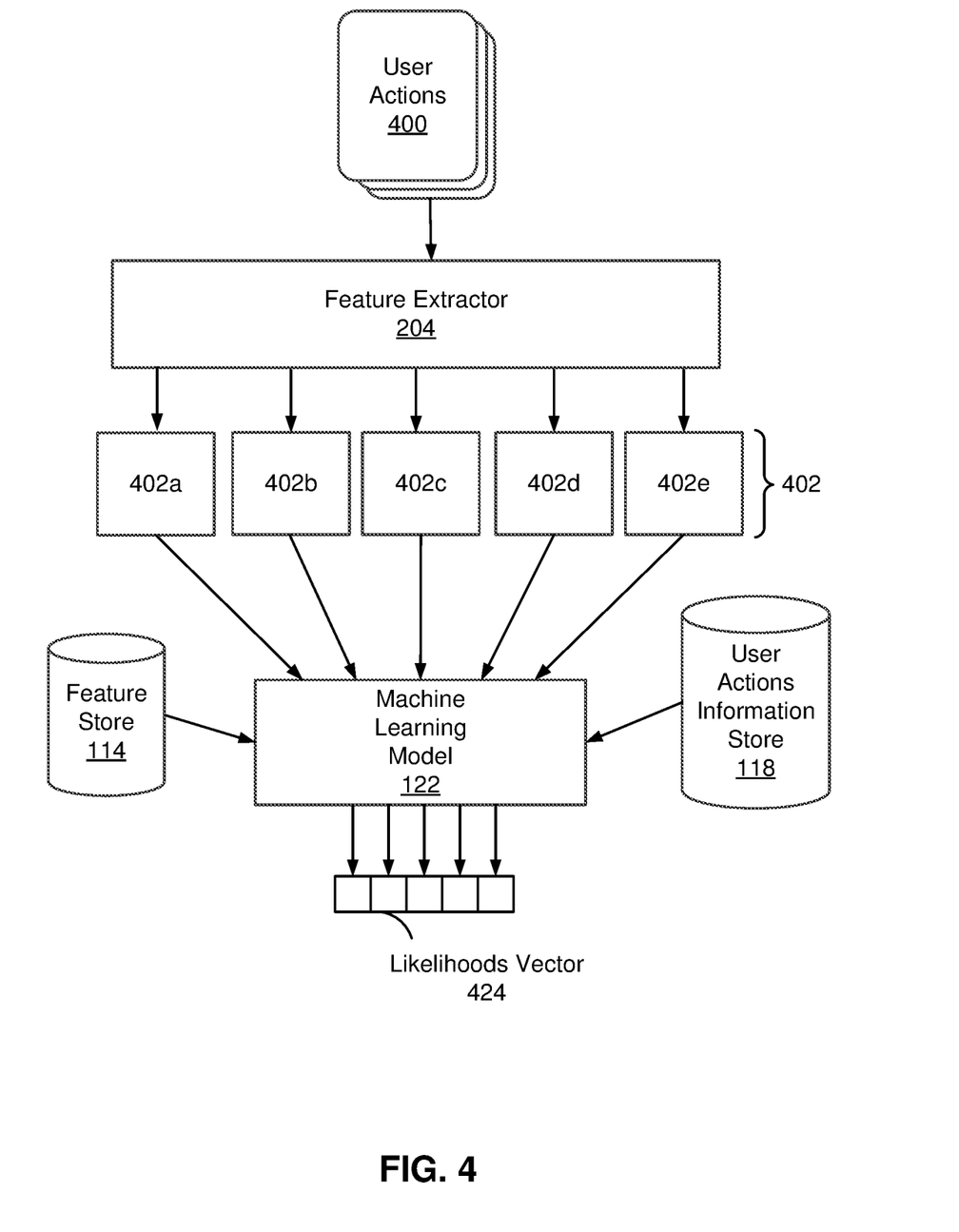
FIG. 4 illustrates an example process for training and executing a machine learning model, in accordance with an embodiment.

FIG. 4 illustrates an example process for training the machine learning model 122 by the machine learning training engine 206. In some embodiments, the process may have different and/or additional steps than those described in conjunction with FIG. 4. Steps of the process may be performed in different orders than the order described in conjunction with FIG. 4. Some steps may be executed in parallel. Alternatively, some of the steps may be executed in parallel and some steps executed sequentially. Alternatively, some steps may execute in a pipelined fashion such that execution of a step is started before the execution of a previous step.

In the training process, the feature extractor 204 extracts feature vectors 402 from the stored information 400 describing the deliveries of the content items by the online publishers ($P_1$, $P_2$, . . . , $P_N$) and the user actions associated with the delivered content items. The feature extractor 204 extracts features 402, which are informative and non-redundant, facilitating training of the machine learning model 122.

Redundant input data in the user actions information 400 may be transformed into a reduced set of features (feature vector 402). The extracted features 402 contain the relevant information from the user actions 400 such that the machine learning model 122 is trained by using this reduced representation instead of the complete initial data in the user actions 400.

The feature vector 402 may include a feature 402a describing a position of a delivery of the content item by an online publisher (e.g., $P_1$) in a set of deliveries (e.g., $P_1$, $P_5$, and $P_7$). The position of a certain publisher in the set may thus lead the machine learning model 122 to learn that publishers that present the content item to a user in between other publishers are most responsible for the user action.

The feature vector 402 may include a feature 402b describing whether an online publisher delivered the content item to the target user within a banner of a web site, an online game, or a body of a webpage. The context of a content item may thus lead the machine learning model 122 to learn that publishers that present the content item to a user in a web banner are most responsible for the user action.

The feature vector 402 may include a feature 402c describing whether the online publisher delivered the content item to a laptop, a desktop, a tablet, or a smartphone of the target user. The type of user device 102 used may thus lead the machine learning model 122 to learn that publishers that present the content item to a user on a smartphone are most responsible for the user action.

Features 402d and 402e may represent whether a user action is a user registering on a website of a content provider 106, a user attending an online event corresponding to the content item, a user sharing the content item with other users, a user clicking on a link in the content item, or a user purchasing a product associated with the content item, etc.

The machine learning training engine 206 trains the machine learning model 122, based on the extracted feature vectors 402. The machine learning training engine 206 trains the machine learning model 122 using training sets including information from the content store 116, the user actions information store 118, and the feature store 114. After the model is trained, the user actions information store 118, and the feature store 114 may be used again in executing the model. A training set may contain a set of features and a label that represents whether the deliveries of a content item resulted in a user action.

As part of the training of the machine learning model 122, the machine learning training engine 206 forms training sets of features 402 that led to user actions, and, in some embodiments, forms negative training sets of features that did not lead to user actions. The machine learning training engine 206 applies dimensionality reduction (e.g., via linear discriminant analysis (LDA), principle component analysis (PCA), or the like) to reduce the amount of data in the feature vector 402 to a smaller, more representative set of data.

The machine learning model 122 is thereby configured to receive a feature vector 402 extracted from information describing a set (e.g., $P_1$, $P_5$, and $P_7$) of the online publishers that delivered a content item associated with a user action, and generate, based on the received feature vector 402, a likelihood ($L_i$) for each online publisher ($P_i$) in the set ($P_1$, $P_5$, and $P_7$) that the user action 400 would have occurred without a delivery of the content item by the online publisher ($P_i$). This may be implemented by configuring the machine learning model 122 to generate a score for each online publisher in a set of online publishers indicative of a likelihood of a user interacting with a content item when that online publisher is absent from the set. Such a score may be indicative of a predicted click-through rate for the online publisher. Based on the training labels used in the training sets, the output of the machine learning model 122 may also be the increase ($EI_i$) in probability that the user action occurred due to the delivery by the particular online publisher ($P_i$). The output of the machine learning model is the vector 424.

Different machine learning techniques-such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps-may be used in different embodiments.

In some embodiments, a validation set is formed of additional features, other than those in the training sets. The machine learning training engine 206 applies the trained machine learning model 122 to the features of the validation set to quantify the accuracy of the machine learning model 122. Common metrics applied in accuracy measurement include: Precision=TP/(TP+FP) and Recall=TP/(TP+FN), where precision is how many the machine learning model 122 correctly predicted (TP or true positives) out of the total it predicted (TP+FP or false positives), and recall is how many the machine learning model 122 correctly predicted (TP) out of the total number of features that did have the property in question (TP+FN or false negatives). The F score (F-score=2×PR/(P+R)) unifies precision and recall into a single measure. In one embodiment, the machine learning training engine 206 iteratively re-trains the machine learning model 122 until the occurrence of a stopping condition, such as the accuracy measurement indication that the model is sufficiently accurate, or a number of training rounds having taken place.

In the execution process, the online system detects a user action associated with a content item performed by a target user. From the stored information 400, information describing a set of the plurality of online publishers that delivered the content item to the target user is retrieved. For each online publisher of the set of the plurality of online publishers, a feature vector is extracted from the retrieved information describing the set of the plurality of online publishers that delivered the content item to the target user. The feature vector is provided to the trained machine learning model 122 that generates the likelihood ($L_i$) that the user action would have occurred without the online publisher's ($P_i$) delivery of the content item to the target user.

The machine learning model or performance metrics generator 208 determines the estimated increase ($EI_i$) in the likelihood that the user action occurred due to the online publisher's delivery of the content item to the target user based on the generated likelihood ($L_i$) that the user action would have occurred without the online publisher's delivery of the content item to the target user. The performance metrics generator 208 determines a performance metric ($Perf_i$) for the online publisher ($P_i$), wherein ratios of performance metrics for the set of the plurality of online publishers are related based on corresponding ratios of estimated increases in likelihoods that the user action occurred due to deliveries of the content item by the set of the plurality of online publishers 126.

Example Performance Metric Aggregation Process

Figure 5:
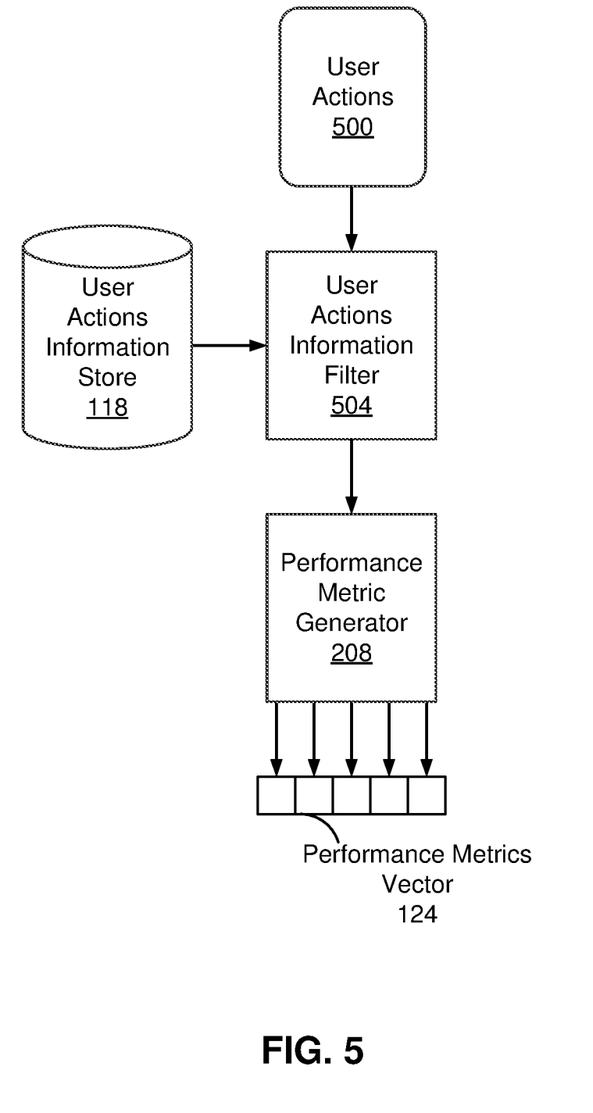
FIG. 5 illustrates an example process for generating a performance metrics vector based on filtering content delivery and user actions information, in accordance with an embodiment The figures depict various embodiments for purposes of illustration only. One skilled in the art will readily recognize from the following discussion that alternative embodiments of the structures and methods illustrated herein may be employed without departing from the principles described herein.

FIG. 5 illustrates an example process for generating a performance metrics vector 124 based on filtering user actions information, in accordance with an embodiment. In some embodiments, the process may have different and/or additional steps than those described in conjunction with FIG. 5. Steps of the process may be performed in different orders than the order described in conjunction with FIG. 5. Some steps may be executed in parallel. Alternatively, some of the steps may be executed in parallel and some steps executed sequentially. Alternatively, some steps may execute in a pipelined fashion such that execution of a step is started before the execution of a previous step.

To build the stored information 118 describing the deliveries of the content items and the user actions associated with the delivered content items, the online system 112 may perform a population study by delivering content items to the users of the online system by different sets of the plurality of online publishers, where each set includes and omits different publishers. The online system may then store the user actions data from these different sets. The decrease in user actions observed by omitting a certain online publisher ($P_i$) may also be stored.

A user action 500 from a target user is detected. The set S of online publishers that delivered the content item to the target user is retrieved by the User Actions Information Filter 504, e.g., ($P_1$, $P_7$, $P_2$). The likelihood that the user action would have occurred without a particular online publisher's ($P_1$) delivery of the content item to the target user is determined by filtering the stored information 118 by the set of online publishers ($P_1$, $P_7$, $P_2$). The filtering is described above with reference to FIG. 3.

The estimated increase ($EI_1$) in the likelihood that the user action occurred due to the online publisher's delivery ($P_1$) of the content item to the target user based on the generated likelihood ($L_1$) that the user action would have occurred without the online publisher's delivery of the content item to the target user is determined as described above with respect to FIG. 2. The performance metrics generator 208 determines the performance metrics vector 124 for each online publisher ($P_i$) in the set S, as described above with reference to FIG. 2.

Alternative Embodiments

The foregoing description of the embodiments have been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the embodiments, which is set forth in the following claims.

What is claimed is:

1. A method, comprising:
    storing, by an online system, information describing deliveries of content items and user actions associated with the delivered content items;
    detecting a user action associated with a content item performed by a target user, wherein the content item was delivered to the target user by each online publisher of a plurality of online publishers;
    retrieving, from the stored information, information describing the plurality of online publishers that delivered the content item to the target user;
    training a machine learning model to predict a likelihood that the user action would have occurred without the online publisher's delivery of the content item to the target user, the training performed using a training dataset comprising a set of feature vectors based on the stored information, each feature vector describing delivery of the content item, and a label indicating whether the user performed the user action responsive to being presented with the content item by the online publisher, the training dataset including a positive set of feature vectors for which the user performed the user action responsive to being presented with the content item by the online publisher and a negative set of feature vectors for which the user did not perform the user action responsive to being presented with the content item by the online publisher;
    for each online publisher of the plurality of online publishers,
    extracting a feature vector from the retrieved information describing the plurality of online publishers that delivered the content item to the target user,
    providing the feature vector to the machine learning model, and
    generating, by the machine learning model based on the feature vector, the likelihood that the user action would have occurred without the online publisher's delivery of the content item to the target user;
    normalizing each of the estimated increases in likelihoods that the user action occurred due to deliveries of the content item by the plurality of online publishers by a sum of the estimated increases in likelihoods;
    determining, using the normalized estimated increases in likelihoods, a plurality of credited performance values representative of respective attributions of each online publisher's delivery of the content item to the detected user action performed by the target user; and
    transmitting the plurality of credited performance values for the user action.

2. The method of claim 1, further comprising:
    extracting feature vectors from the stored information describing the deliveries of the content items and the user actions associated with the delivered content items, the extracted feature vectors including, for each of the plurality of online publishers, a positive set of feature vectors for which the user performed the user action responsive to being presented the content item by the respective online publisher and a negative set of feature vectors for which the user did not perform the user action responsive to being presented the content item by the respective online publisher.

3. The method of claim 1, wherein a feature of the feature vector comprises:
    a position of a delivery of the content item by the online publisher in a sequence of deliveries of the content item by the plurality of online publishers.

4. The method of claim 1, wherein a feature of the feature vector comprises:
    whether the online publisher delivered the content item to the target user within a banner of a web site, an online game, or a body of a webpage.

5. The method of claim 1, wherein a feature of the feature vector comprises:
    whether the online publisher delivered the content item to a laptop, a desktop, a tablet, or a smartphone of the target user.

6. The method of claim 1, wherein the user action associated with the content item comprises one or more of:
    a user of the online system registering on a web site of a content provider;
    the user attending an online event corresponding to the content item;
    the user sharing the content item with other users of the online system;
    the user clicking on a link in the content item; and
    the user purchasing a product associated with the content item.

7. The method of claim 1, wherein the stored information describing the deliveries of the content items and the user actions associated with the delivered content items comprises:
    for each user action associated with a content item, a sequence of online publishers of the plurality of online publishers that delivered the content item.

8. The method of claim 1, wherein the stored information describing the deliveries of the content items and the user actions associated with the delivered content items comprises:

information indicating whether each content item was delivered within one or more of a banner of a website, an online game, or a body of a webpage.

9. The method of claim 1, wherein the stored information describing the deliveries of the content items and the user actions associated with the delivered content items comprises:
information indicating whether each content item was delivered to one or more of a laptop, a desktop, a tablet, or a smartphone.

10. The method of claim 1, further comprising:
receiving at least a portion of the information describing deliveries of content items and user actions associated with the delivered content items from user devices, responsive to rendering tracking pixels on web sites of the plurality of online publishers.

11. The method of claim 1, wherein the determining of the likelihood that the user action would have occurred without the online publisher's delivery of the content item to the target user comprises:
filtering the stored information describing the deliveries of the content items and the user actions associated with the delivered content items, by the set of the plurality of online publishers, to obtain the likelihood that the user action would have occurred without the online publisher's delivery of the content item to the target user.

12. The method of claim 11, further comprising:
for each online publisher of the plurality of online publishers, delivering content items to the users of the online system by a subset of the plurality of online publishers, the subset not including the online publisher; and
receiving user actions associated with the delivered content items, responsive to the delivering of the content items by the subset.

13. A non-transitory computer-readable storage medium comprising instructions executable by a processor, the instructions comprising instructions for:
storing information describing deliveries of content items and user actions associated with the delivered content items;
detecting a user action associated with a content item performed by a target user, wherein the content item was delivered to the target user by each online publisher of a plurality of online publishers;
retrieving, from the stored information, information describing the plurality of online publishers that delivered the content item to the target user;
training a machine learning model to predict a likelihood that the user action would have occurred without the online publisher's delivery of the content item to the target user, the training performed using a training dataset comprising a set of feature vectors based on the stored information, each feature vector describing delivery of the content item, and a label indicating whether the user performed the user action responsive to being presented with the content item the online publisher, the training dataset including a positive set of feature vectors for which the user performed the user action responsive to being presented with the content item by the online publisher and a negative set of feature vectors for which the user did not perform the user action responsive to being presented with the content item by the online publisher;
for each online publisher of the plurality of online publishers,
extracting a feature vector from the retrieved information describing the plurality of online publishers that delivered the content item to the target user,
providing the feature vector to the machine learning model, and
generating, by the machine learning model based on the feature vector, the likelihood that the user action would have occurred without the online publisher's delivery of the content item to the target user;
normalizing each of the estimated increases in likelihoods that the user action occurred due to deliveries of the content item by the plurality of online publishers by a sum of the estimated increases in likelihoods;
determining, using the metrics estimated increases in likelihoods, a plurality of credited performance values representative of respective attributions of each online publisher's delivery of the content item to the detected user action performed by the target user; and
transmitting the plurality of credited performance values for the user action.

* * * * *

UNITED STATES PATENT AND TRADEMARK OFFICE
CERTIFICATE OF CORRECTION

PATENT NO. : 11,238,490 B2
APPLICATION NO. : 15/792641
DATED : February 1, 2022
INVENTOR(S) : Chaochao Cai It is certified that error appears in the above-identified patent and that said Letters Patent is hereby corrected as shown below:

In the Claims

In Column 16, Claim 13, Line 37, delete "using the metrics" and insert -- using the --, therefor.

Signed and Sealed this
Thirty-first Day of May, 2022

Katherine Kelly Vidal
Director of the United States Patent and Trademark Office